Dec. 22, 1964 A. GERLACH ETAL 3,162,776

SHIFT REGISTER

Filed June 1, 1962

INVENTOR.
ALBRECHT GERLACH
KARL HEINZ WILKE

BY

ATTORNEY

United States Patent Office 3,162,776

Patented Dec. 22, 1964

3,162,776

SHIFT REGISTER

Albrecht Gerlach, Freiburg im Breisgau, and Karl-Heinz Wilke, Balingen, Germany, assignors to Clevite Corporation, a corporation of Ohio Filed June 1, 1962, Ser. No. 199,431
Claims priority, application Germany, June 2, 1961, J 20,016
7 Claims. (Cl. 307—88.5)

This invention relates to information storage devices and particularly to shift registers for information expressed in the form of binary digits.

Conventionally, shift registers consist of a bank of switching devices having two distinct stable conditions, e.g., conduction ("on") and non-conduction ("off"). The switching devices are interconnected in a cascade so that when the respective stages are in one or the other of the two possible states, reflecting a particular quantity or "bit," a pulse can be applied to displace the bit by one place in a predetermined direction along the cascade.

Due to the fact that each bistable stage of the arrangement consists, in conventional shift registers, of a pair of switching elements interconnected for inverse response, the circuitry of the register is characteristically quite complex and embodies a relatively large number of components.

The fundamental object of the present invention is to provide shift register circuits which are far less complex than known heretofore and in which each bistable stage has only a single switching element.

Stated generally a shift register according to the present invention comprises a plurality of bistable stages interconnected in cascade, each stage including a bistable element having a Thyratron characteristic. Means are provided for applying a voltage pulse effective simultaneously to render the bistable element in all stages temporarily non-conductive and additional means are provided for applying a subsequent voltage pulse effective to render conductive only the bistable elements in those stages of the cascade immediately succeeding, in a predetermined directional sequence, stages which were conductive prior to application of the first-mentioned voltage pulse.

Figure 1:
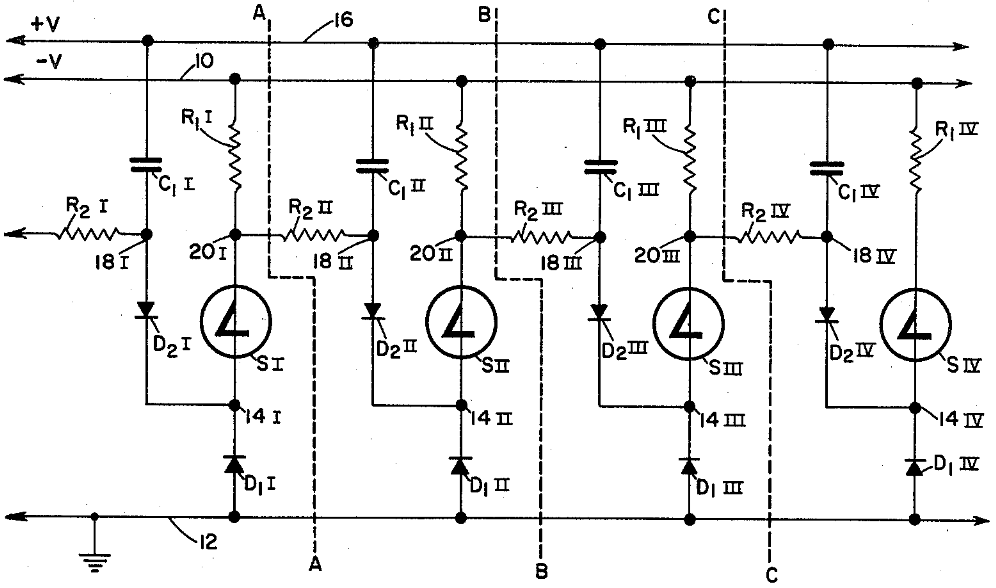
Figure 2:
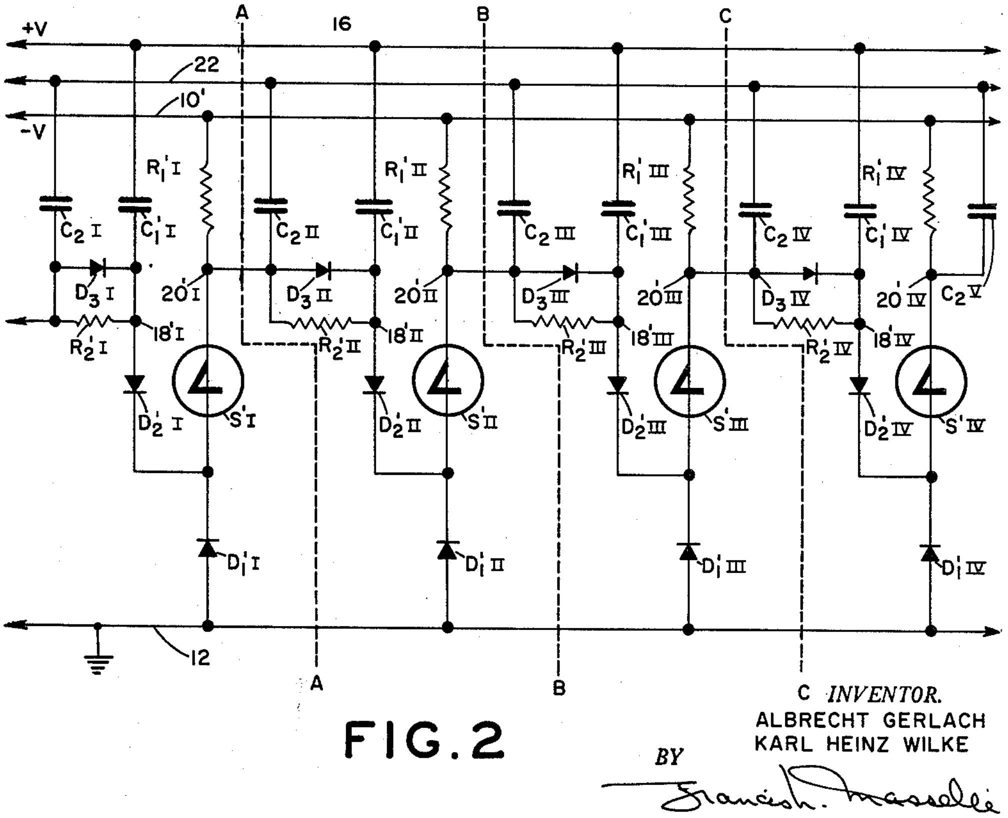

Additional objects of the invention, its advantages, scope and the manner in which it may be practiced will be more readily apparent to persons conversant with the art from the following detailed description of exemplary embodiments thereof taken in conjunction with the subjoined claims and the annexed drawing in which like reference numerals denote like parts throughout the several views and FIGURE 1 is a schematic wiring diagram of a four-stage segment of a shift register embodying the present invention; and FIGURE 2 is a view similar to FIGURE 1 showing a modified form of shift register.

Before describing the circuits represented by the wiring diagrams and their function, it is pointed out that "Thyratron characteristic" as used herein is intended to denote the property of a circuit element which enables it, upon the application of a prescribed voltage, to switch abruptly to a low impedance or conductive condition and, upon exceeding a certain critical current, to switch back to a high impedance or non-conductive condition. In the embodiments described hereinbelow by way of example the bistable element having a Thyratron characteristic is a two terminal device, viz., a four-layer semiconductor diode (sometimes referred to as a Shockley diode); it is to be understood, however, that other bistable devices can be used including devices having control electrodes, comparable to the grid of a Thyratron tube, and/or other electrodes. With allusion to the Thyratron characteristic terms such as ignite and extinguish or cut-off, with their related forms, may be employed in the following description and subjoined claims.

Referring now to the drawings, there is illustrated schematically the essential circuitry of two forms of shift register embodying the present invention. Inasmuch as the device in both cases consists of a plurality of substantially identical stages connected in cascade, the respective circuit configurations repeat themselves, and, accordingly, have been sub-divided by broken line A, B, and C into four identical segments only one of which will be described in detail.

To make clear the terms of reference, each of the stages proper of the cascade have been designated by Roman numerals, viz., I, II, III and IV, which are intended to designate the stages apart from the inter-stage coupling networks as will more fully appear as this description proceeds.

To facilitate correlation between corresponding circuit components of the various segments of the respective diagrams, a consistent system of reference designation has been employed using like Arabic numerals for like parts with Roman numeral suffixes appropriately applied to indicate the stage in which a particular component or location occurs.

Referring now to FIGURE 1, stages I, II, III and IV consist of respective current paths connected in parallel between a source of bias potential, e.g., of a magnitude —V, represented in the diagram by conductor 10, and a return line represented by grounded conductor 12. As indicated by the arrowheads at the end of conductors 10 and 12, these may be connected to preceding and/or succeeding stages duplicating those illustrated and/or control or utilization circuits, not shown, or the like.

Taking stage I as an example, the current path consists of a resistive impedance, represented by resistor $R_1$–I in series with a bistable four-layer diode $S_I$ and a diode rectifier $D_1$–I. Diode rectifier $D_1$–I is polarized to offer low impedance to current flow through the path when bistable diode $S_I$ is conducting. Diode $D_1$–I is biased by voltage pulses, applied in a manner hereinafter described, in a reverse direction so as to offer high impedance to such pulses.

An ignition pulse conduction path made up of a capacitor $C_1$–I in series with diode rectifier $D_2$–I connects a point 14–I between the bistable diode and diode rectifier of stage I to a source, represented by conductor 16, of an operating voltage pulse of proper magnitude and polarity to ignite diodes $S_I$. In the illustrated example a positive voltage pulse +V of about the same magnitude as the negative potential —V applied to conductor 10 is satisfactory.

A resistor $R_2$–I may connect a point 18–I between capacitor $C_1$–I and diode rectifier $D_2$–I of the ignition pulse conduction path of stage I to a point between the resistive impedance and bistable element of a preceding stage, not shown. In like manner, resistor $R_2$–II connects a point 20–I between the resistive impedance and bistable diode of stage I to a point 18–II between the capacitor and diode rectifier of the ignition pulse conduction path associated with the succeeding stage, II. Respective resistors $R_2$–III and $R_2$–IV interconnect stages II–III and III–IV in like manner.

Shifting of the register is effected by first reducing the potential —V in conductor 10 to 0 or giving it a positive value. This extinguishes the bistable diodes in all stages. The extinction pulse is followed closely by an ignition pulse +V applied to conductor 16 and, consequently, to respective ignition pulse conduction paths associated with each of the stages. For reasons which will appear presently, the time interval between the extinction and ignition pulses must be sufficiently brief that no appreciable change can occur in the charge on capacitors $C_1$–I . . . $C_1$–IV.

The circuit performs its function in the following manner. Let it be assumed, for the sake of example, that the register contains information represented by conduction in stages II and III and non-conduction in stages I and IV, i.e., signifying binary digit 0110. In this condition, the lower plate of condenser $C_1$–II is charged to potential −V through relatively low magnitude resistance $R_1$ and relatively high magnitude resistance $R_2$–II, due to the fact that bistable diode $S_I$ is cut-off. At the same time, due to the fact that bistable diode $S_{II}$ is conducting, the lower plate of capacitor $C_1$–III is only slightly negative with respect to the reference potential of conductor 12. And, because bistable diode $S_{III}$ is also conductive the same is true of capacitor $C_1$–IV.

When the potential in conductor 10 falls to zero or goes positive, all bistable diodes $S_I$–$S_{IV}$ are simultaneously extinguished. Upon application of the ignition pulse to conductor 16 only the bistable diodes of stages III and IV are ignited. The ignition pulse does not reach point 14–II of stage II because it is blocked by diode $D_2$–II which is reversed-biased by the high charge on capacitor $C_1$–II.

Whether or not bistable diode $S_I$ of stage I is ignited by the ignition pulse depends on the charge existing in capacitor $C_1$–I which in turn depends on whether or not the preceding stage, not shown, was conducting or not prior to be extinguished.

Thus, it will be seen that the ignition pulse is effective only upon stages immediately following, in a predetermined directional sequence, stages which were conducting prior to application of the extinguishing pulse. Conversely, of course, the ignition pulse is not effective on stages immediately following those which were non-conductive prior to the extinguishing pulse. As a result the bit stored in the register is shifted one place in a predetermined direction, to the right in the illustrated embodiment, by the application of the shifting pulses.

The shifting frequency of the register circuit illustrated in FIGURE 1 is limited by the fact that the interval between two consecutive shifts must be large in comparison to the interval between the extinguishing pulse and the ignition pulse, i.e., the frequency is limited by the time constant $C_1$, $R_2$. The maximum value of this time constant is in turn limited by the fact that it must be small enough that no substantial change in charge occurs on capacitors $C_1$–I . . . $C_1$–IV in the interval between the extinguishing and ignition pulses.

A higher shifting frequency may be attained by a modification of the circuitry to the form illustrated in FIGURE 2. It will be appreciated from inspection and comparison of primed reference numerals corresponding to numerals in FIGURE 1, that the modified circuit embodies that already described; consequently, only the additional features constituting the modification will be set forth in detail.

In the FIGURE 2 circuit an extinguishing pulse conduction path is provided for each stage consisting of a respective capacitor $C_2'$–II . . . $C_2'$–V connecting points 20'–I . . . 20'–IV of stages I, II, III and IV, respectively, to a conduit 22 leading to a source of an extinguishing pulse of positive polarity and a few volts magnitude. (Capacitor $C_2'$–I is in the extinguishing pulse conduction-path to a stage not shown and therefore will be disregarded.)

The only other difference in the FIGURE 2 circuit as compared to FIGURE 1 is that relatively high magnitude resistors $R_2'$–I . . . $R_2'$–IV are shunted by asymmetrical resistance elements represented by diode rectifiers $D_3$–I . . . $D_3$–IV, respectively.

The FIGURE 2 circuit operates in the same manner as that shown and described with reference to FIGURE 1 except that the extinguishing pulse takes the form of a positive voltage pulse applied to conductor 22 instead of an interruption of the negative bias potential applied to conductor 10'.

As in the case of FIGURE 1, the extinguishing pulse is followed immediately by a positive ignition pulse of magnitude +V applied to conductor 16'. The extinguishing pulse passes through respective capacitors $C_2'$–II . . . $C_2'$–V to respective points 20'–I . . . 20'–IV temporarily biasing the respective bistable diodes $S'_I$ . . . $S'_{IV}$ to cut-off.

The degree of charging which occurs in capacitors $C_1'$–I . . . $C_1'$–IV as in the case of FIGURE 1, depends on whether or not the respective preceding stage was conductive or non-conductive prior to application of the extinguishing pulse. However, in the FIGURE 2 circuit, charging of the lower plate of capacitors $C_1'$–I . . . $C_1'$–IV takes place rapidly through the relatively low impedance of forwardly-biased diodes $D_3'$–I . . . $D_3'$–IV by-passing high impedance resistors $R_2'$–I . . . $R_2'$–IV. Consequently, the shifting frequency of which the FIGURE 2 embodiment is capable, is not determined by the time constant of capacitors $C_1'$–I . . . $C_1'$–IV and high-impedance resistors $R_2'$–I . . . $R_2'$–IV but rather by the time constant of capacitors $C_1'$–I . . . $C_1'$–II and relatively low impedance of resistors $R_1'$–I . . . $R_1'$–IV or the product of respective capacitances $C_2$–II . . . $C_2$–V and resistances $R_1'$–I . . . $R_1$–IV.

Upon ignition of any of bistable elements $S_I$ . . . $S_{IV}$ the associated capacitor $C_1'$–I . . . $C_1'$–IV discharges through the low impedance of diode $D_3$–I . . . $D_3$–IV. Under certain circumstances resistors $R_2'$–I . . . $R_2'$–IV may be omitted; they are required only when the time interval between the two shifting pulses is relatively large. In this case they insure that the potential on the lower plate of capacitors $C_1'$–I . . . $C_1'$–IV will not be governed by the ratio of the reverse impedance of diodes $D_2'$–I . . . $D_2'$–IV and $D_3$–I . . . $D_3$–IV but will attain the potential occurring at respective points 20'–I . . . 20'–IV; to accomplish this result the valve of resistance $R_2'$–I . . . $R_2'$–IV must be about one order of magnitude smaller than the reverse impedance of diodes $D_2'$–I . . . $D_2'$–IV.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by United States Letters Patent is:

1. A circuit arrangement for a shift register comprising:

a plurality of current paths connected in parallel between a potential source and return, each of said current paths containing resistive impedance means, a bistable switching element having a Thyratron characteristic, and an asymmetrical impedance means connected in series in the stated sequence between said potential source and return;

circuit means coupling said current paths in cascade;

means for simultaneously, momentarily rendering the respective bistable elements of all said current paths non-conductive;

means for applying a pulse adapted to bias the bistable elements to conduction; and means for rendering the last said means effective only upon the bistable elements in current paths immediately succeeding in a predetermined directional sequence, current paths which were conducting prior to operation of the first said means for rendering the bistable elements of all said current paths non-conductive.

2. A circuit arrangement for a shift register comprising:

a plurality of current paths connected in parallel between a potential source and return, each of said current paths being substantially identical in configuration and containing a resistive impedance, a bistable four-layer semiconductor diode, and an asymmetrical impedance element connected in series in the stated sequence between said potential source and return, the polarity of the asymmetrical impedance element being such as to present low impedance to current flow through said path when said bistable diode is in a conductive state;

circuit means coupling said current paths in cascade;

means for simultaneously, momentarily biasing the respective bistable diodes of all said current paths to non-conduction;

respective means for conducting to each of said current paths, at a point between the respective bistable diode and asymmetrical impedance element thereof, a pulse adapted to bias the respective bistable diodes to conduction; and means including a respective charge storage element coupled in said pulse-conducting means so as to acquire, in response to a condition of non-conductivity in an immediately preceding stage, in a predetermined directional sequence, a charge effective to negate, for the respective stage, a pulse applied to said pulse-conducting means and otherwise effective to bias the bistable diode of the respective stage to conduction.

3. A circuit arrangement for a shift register comprising:

a plurality of unidirectional current paths connected in parallel between a potential source and return, each of said current paths being substantially identical in configuration and containing, connected in series in the stated sequence between the potential source and return, a resistor, a bistable four-layer semiconductor diode having a Thyratron characteristic and distinct stable conditions of conductivity and non-conductivity, and a diode rectifier polarized to present low impedance to current flow through said path when said bistable diode is in conductive condition;

a respective conduction path for applying to said current paths, a voltage pulse adapted to bias the respective bistable diodes therein to conduction, each said conduction path containing a capacitor and diode rectifier connected in series between a source of such a voltage pulse and a point between the bistable diode and diode rectifier of the respective current path; and a respective resistive impedance means coupling a point between the bistable diode and resistor in each current path to a point between the capacitor and diode rectifier of the pulse conduction path associated with the next succeeding current path in a predetermined directional sequence.

4. A switching circuit according to claim 3, wherein each said respective impedance means includes a resistor shunted by an asymmetrical resistance element.

5. A switching circuit according to claim 4, wherein each said respective impedance means is an asymmetrical resistance element.

6. A switching circuit according to claim 4 including:

a respective cut-off pulse conduction path for each said current path including a capacitor coupling a point between the bistable diode and resistor of the respective current path to a source of pulse potential adapted to bias said bistable diodes to non-conduction.

7. A switching circuit comprising:

a plurality of unidirectional current paths connected in parallel between a potential source and return, each of said current paths being substantially identical in configuration and containing, connected in series in the stated sequence between the potential source and return, a resistor, a bistable four-layer semiconductor diode having a Thyratron characteristic and distinct stable conditions of conductivity and non-conductivity, and a diode rectifier polarized to present low impedance to current flow through said path when said bistable diode is in conductive condition;

a respective conduction path for applying to said current paths a voltage pulse adapted to bias the respective bistable diodes therein to conduction, each said conduction path containing a capacitor and diode rectifier connected in series between a source of such a voltage pulse and a point between the bistable diode and diode rectifier of the respective current path;

a respective second resistor, of greater magnitude than the first said resistor coupling a point between the bistable diode and resistor in each said current path to a point between the capacitor and diode rectifier of the pulse conduction path associated with the next succeeding current path in a predetermined directional sequence; an asymmetrical resistance element shunting each said second resistor; and a respective capacitor coupling a point between the bistable diode and first resistor of each said current path to a source of pulse potential adapted to bias said bistable diodes to non-conduction.

References Cited in the file of this patent

UNITED STATES PATENTS 2,798,983 Warman ---------------- July 9, 1957

OTHER REFERENCES

Carlson and McMahon "PNPN Four-Layer Diodes In Switching Functions," Electrical Manufacturing, January 1960, pp. 75, 76.